Feb. 9, 1943.  M. W. CREW ET AL  2,310,678
BAROMETRIC REGULATOR
Filed March 15, 1941   2 Sheets—Sheet 1
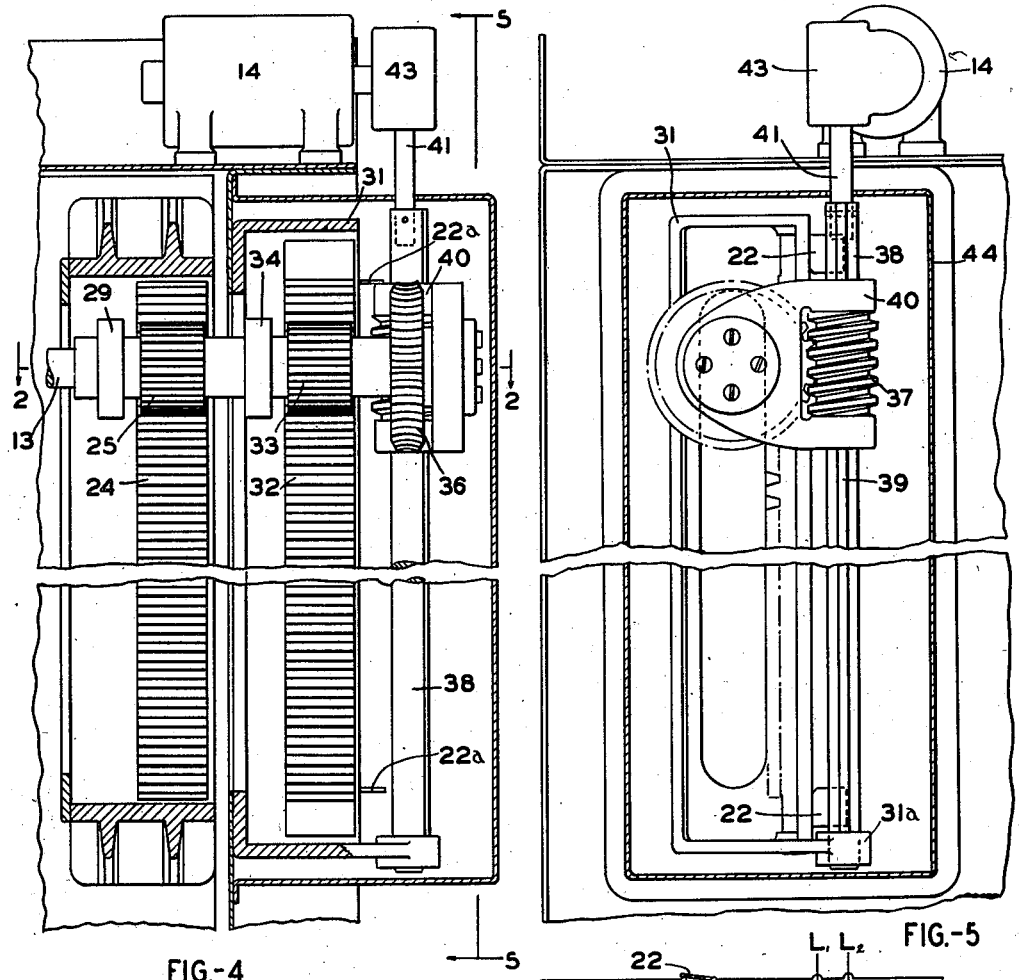
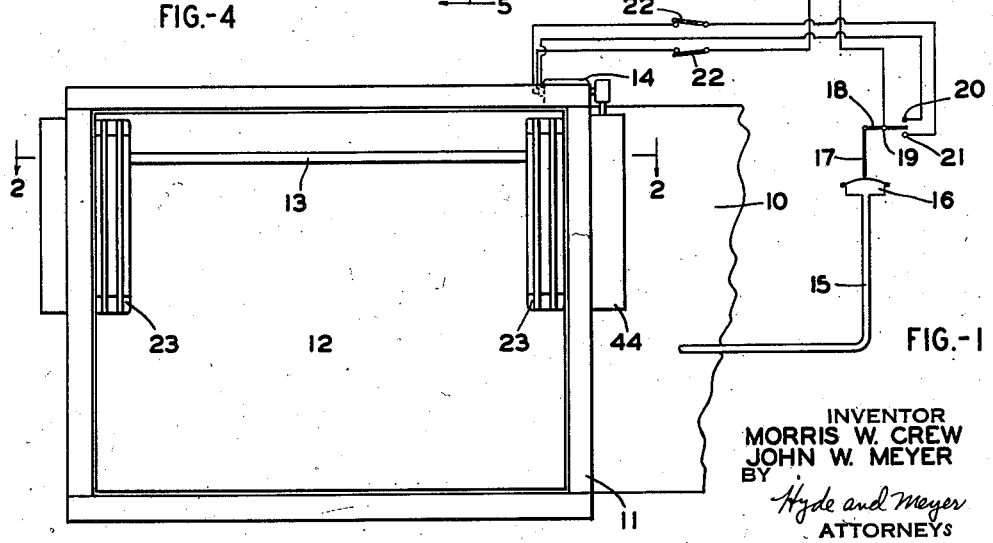
INVENTOR
MORRIS W. CREW
JOHN W. MEYER
BY
Hyde and Meyer
ATTORNEYS Feb. 9, 1943.  M. W. CREW ET AL  2,310,678
BAROMETRIC REGULATOR
Filed March 15, 1941  2 Sheets-Sheet 2

INVENTOR
MORRIS W. CREW
JOHN W. MEYER
BY
Hyde and Meyer
ATTORNEYS

Patented Feb. 9, 1943

2,310,678

UNITED STATES PATENT OFFICE 2,310,678

BAROMETRIC REGULATOR

Morris W. Crew and John W. Meyer, Shaker Heights, Ohio, assignors to The Hotstream Heater Company, Cleveland, Ohio, a corporation of Ohio Application March 15, 1941, Serial No. 383,651

11 Claims. (Cl. 137—152)

This invention relates to improvements in barometric regulators and automatically controlled draft dampers.

Prior dampers of this type have utilized adjustable counterweights for changing the balance of the damper relative to its pivot so that a given amount of draft will cause different openings of the damper depending upon where the counterweight is set. An object of the present invention is to cause a relative adjustment between the pivot and damper so as to change the balance of the damper about its pivot without the use of counterweights.

Other objects and advantages of the invention include a novel pivoting of a draft damper about the line of contact between a pinion and a rack, and include also novel means for shifting a pivot relative to its associated damper, and other objects and advantages which will be apparent from the accompanying drawings and description.

In the drawings Fig. 1 is a general elevational view of a damper equipped with our improved control mechanism with the control circuits shown diagrammatically;

Fig. 4 is a vertical sectional view taken along the line 4—4 of Fig. 2; while

Fig. 5 is an end view of the mechanism of Fig. 4 taken substantially in the position indicated at 5—5 of Fig. 4.

Figure 2:
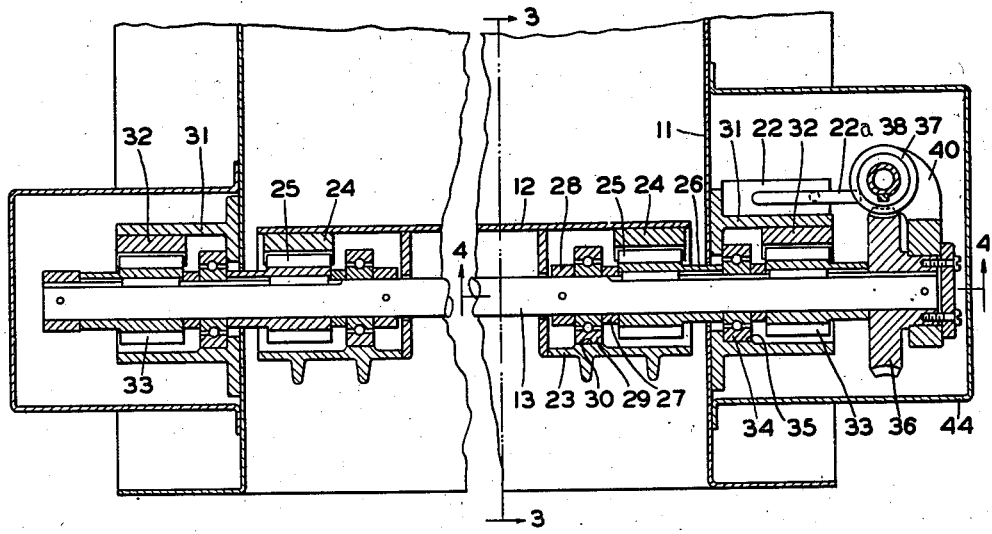
Fig. 2 is an enlarged sectional view taken along the line 2—2 of Fig. 1 and along a similarly numbered line of Fig. 4.

The damper here involved may be used to close any opening in a conduit or other support through which air flows, usually for combustion purposes. For convenience in descripton, and in no sense of limitation, in Fig. 1 we have indicated at 10 the breeching of a boiler or other combustion unit having a branch box-like member at 11 which is open at the rectangular end viewed in the drawing, this opening being controlled by the rectangular damper 12 which substantially fits against the sides of the box opening. This damper is swung from the supporting shaft 13, it being understood that in this type of damper this shaft is generally off center so that the weight of that portion of the damper below the shaft 13 tends to close it while the draft or suction in the breeching 10 tends to open it. In the present invention, by controlling the position of the shaft 13 on the vertical face of the damper, the weight of that portion of the damper below the shaft is varied so as to vary the amount of damper opening for a given suction. Means to be later described driven by motor 14 controls the movement of the shaft 13 relative to the damper 12. Any desired regulator may be utilized to control this movement. For instance, it could be controlled from any sort of thermostatic or pressure gauge, draft gauge or the like so as to maintain the desired draft or pressure conditions in the breeching 10 depending upon the amount of atmospheric air introduced at the damper 12.

The control here shown diagrammatically comprises a draft pipe 15 communicating with the breeching 10 and leading to a diaphragm chamber 16. A rod 17 communicates the diaphragm movement to a switch lever 18 which has a fixed pivot at 19. The electric current for motor 14 is supplied from the lines $L_1$, $L_2$, of which the latter is directly connected to the common point 19. When the diaphragm moves in one direction the switch will make contact at the point 20, thus completing the circuit through motor 14 to drive it in one direction, whereas when the switch makes contact at the point 21 the motor will be driven in the opposite direction. Thus the shaft 13 will be moved up and down so as to maintain a constant pressure in the diaphragm chamber 16 and in the breeching 10. The switches 22 represent limit switches to be later described.

The connection between damper 12 and shaft 13 is one which permits relative shifting movement between these two parts, but without disturbing the relation between the damper and its opening when the opening is closed. It will be obvious to those skilled in this art that by making the box member 11 larger the pivot 13 might be held stationary and the damper 12 moved up and down relative thereto. This would change the balance of the damper on its pivot. However, we prefer the arrangement here described wherein the damper 12 remains stationary and the shaft 13 is moved. To this end, inside of each housing 23 on the damper is a mechanism more clearly shown in Figs. 2, 3 and 4. These mechanisms are identical and therefore only one need be described. A rack 24 is rigidly secured in vertical position upon one face (preferably the outer one) of damper 12. A pinion 25 fixed on shaft 13 meshes with the rack. The pinion is held in position by collars 26, 27 and 28, the latter of which also holds in place an annular ball bearing 29. This bearing on the side away from the damper engages a very carefully located machined surface 30 which holds the pinion 25 in proper engagement with the rack 24. It results from this construction that in any position of the parts the damper 12 is supported solely at the point where one of the teeth of pinion 25 engages one of the teeth of rack 24. In actual practice, of course, the damper is evenly suspended by such tooth support at each side thereof as best seen in Fig. 1. This gives a very free swinging movement of the damper because there is substantial line contact where the rack and pinion teeth mesh. Furthermore, this line of contact is constantly changing as the pinion rolls on the rack, so that no flat surfaces are formed.

Figure 3:
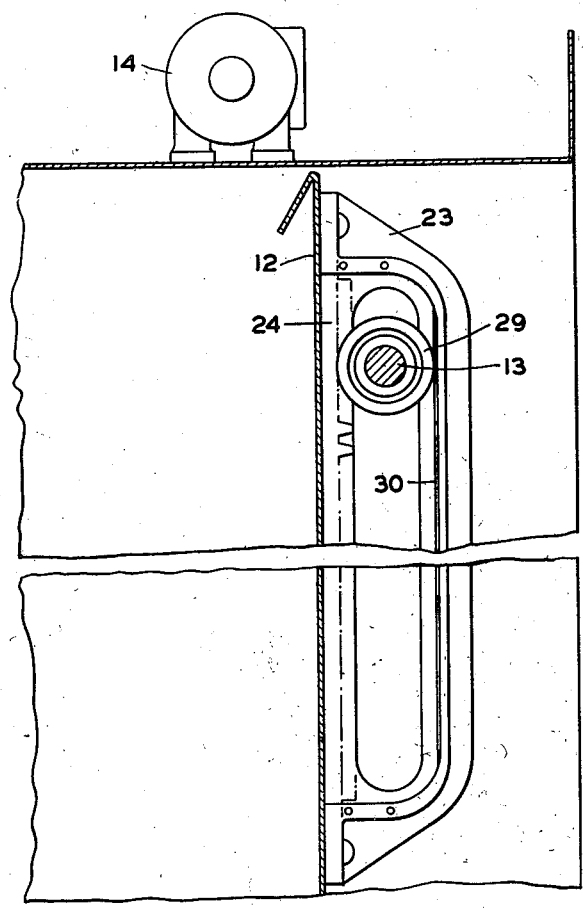
Fig. 3 is a vertical sectional view taken along the line 3—3 of Fig. 2.

The shaft 13, as best seen in Fig. 2, extends through suitable openings in the box 11 laterally beyond the edges of damper 12. Fixed to the outer wall of the box 11 is a housing 31 to which is attached a rack 32, parallel to rack 24. There is one of these on each side of the box 11, as shown in Fig. 2. A pinion 33 fixed to shaft 13 meshes with each rack 32, these pinions being held in mesh by the engagement of ball bearing 34 with a machined surface 35 analogous to the surface 30 already described. Here again suitable collars hold the pinions and bearings in place.

At the right hand end of shaft 13 as viewed in Figs. 2 and 4 is pinned a worm gear 36 which meshes with a worm 37 in turn mounted upon a vertical shaft 38. A key 39 on shaft 38 engages a suitable slot in worm 37 so as to permit the worm to turn with shaft 38 while sliding longitudinally upon it. A yoke 40 holds the worm and worm gear constantly in mesh. At its lower end the shaft 38 has a bearing in an extension 31a of housing 31. At its upper end the shaft 38 is pinned to shaft 41 of motor 14 which acts through reduction gears 43. In the present instance I utilize a series wound universal motor having a speed of 10,000 R. P. M. at no load and 4,000 R. P. M. at full load. With the double reduction gearing here shown the output speed of shaft 41 is 11 to 37 R. P. M. I find that a one-fortieth horse power motor will shift the pivot on a damper weighing 100 pounds with no appreciable load upon the motor. I believe this effect is due to the fact that at no time is the weight of the damper 12 lifted by the motor, but the motor merely has to overcome the friction between the various gear parts. The bearing of shaft 41 serves also as the upper bearing for shaft 38. A housing 44 may be utilized to fully enclose the equipment outside of box 11.

As motor 42 rotates shaft 38 the worm 37 will rotate gear 36 and shaft 13, whereupon the pinions 33 travel vertically along the racks 32, changing the position of shaft 13. If the control equipment illustrated in Fig. 1 runs the worm 37 to the top or bottom limits of shaft 38 it is desirable to stop the operation of the motor. To this end limit switches 22 are secured in proper position on housing 31, as best seen in Fig. 5. These switches may be of the type disclosed in Patent No. 1,960,020, granted May 22, 1934, to P. K. McGall, but in any case the operating member 22a as shown in Figs. 2 and 4 lies in a position to be engaged by the yoke 40 as it reaches one end or the other of its travel.

Obviously the damper 12 will remain in its suspended position swinging on shaft 13 in any position to which this latter shaft is moved due to the fact that reverse movement of the parts is impossible because the gear 36 cannot drive the worm 37.

It will be noted that the pitch diameters of all of pinions 25 and 33 are identical. As a consequence, upon rotation of shaft 13, and due to its confinement for vertical motion in the housings 23, the shaft rolls vertically on its supports in the stationary housings by parallel motion, as it were. At the same time, relative rolling motion of the same kind occurs between the shaft and its pinions 25 and the racks 24 upon the damper. As a consequence, rotatable adjustment of the shaft shifts its position in a direction at right angles to the length of the shaft across the surface of the damper and thus varies the proportionate distribution of the material of the damper above and below the shaft. The ultimate result, of course, is to vary the sensitivity of the damper to the effect of the air stream moving through the opening, or, in the specific instance illustrated, to the suction effect in the boiler. The adjustment of the shaft simultaneously along both its stationary support and across the face of the damper takes place without disturbing the relation of the damper to the opening which it closes when the damper is in the proper position to close the opening.

What we claim is:

1. In combination, a draft damper, a shaft extending adjacent one face of said damper, means mounting said damper pivotally on said shaft, said means being shiftable in a plane along the face of said damper, and means independent of said damper for mounting said shaft for movement parallel to said plane.

2. The combination of claim 1 wherein said last named means comprises coacting rack and pinion members, one of said members being fixed, the other of said members being movable with said shaft, and means for causing movement of said movable member.

3. In combination, a draft damper, a shaft extending adjacent one face of said damper, means mounting said damper pivotally on said shaft, said means being shiftable in a plane along the face of said damper, a worm gear rotatable with said shaft, a worm meshing with said gear, means holding said worm and gear in mesh, means for rotating said worm, and means responsive to rotation of said worm gear and shaft for shifting said mounting means along the face of said damper.

4. In combination, a draft damper, a shaft extending adjacent one face of said damper, a rack rigidly mounted on said damper at right angles to said shaft, a fixed rack parallel to said first named rack and at one side of said damper, pinions fixed on said shaft, one pinion engaging each rack respectively, a worm gear rigidly mounted on said shaft, a second shaft, a worm on said second shaft meshing with said gear, said worm being rotatable with and slidable longitudinally of said second shaft, and means for rotating said second shaft, whereby rotation of said second shaft and worm causes said worm gear to rotate said first named shaft and said pinions, causing aid first named shaft to travel in a direction at right angles to its axis across the face of the damper.

5. In combination, a support having an opening, a damper for closing said opening, a shaft mounted in said support and upon which the damper is swingingly mounted, and means for simultaneously adjusting the shaft transversely to its length along both the support and the damper without affecting the relation between the damper and its opening when the opening is closed.

6. In combination, a support having an opening, a damper for closing said opening, a shaft mounted in said support and upon which the damper is swingingly mounted, and means for simultaneously adjusting the shaft transversely to its length along both the support and the damper without affecting the relation between the damper and its opening when the opening is closed, said means including corresponding rack and pinion connections between the shaft and each of the support and damper to produce relative rolling motion of the shaft with relation to both the support and damper during such adjustment.

7. In combination, a support having an opening, a damper for closing said opening, a shaft mounted in said support and upon which the damper is swingingly mounted, means for simultaneously adjusting the shaft transversely to its length along both the support and the damper without affecting the relation between the damper and its opening when the opening is closed, and operating means on the support connected to the shaft and effective for rotatably adjusting it in any of its positions.

8. In combination, a support having an opening, a damper for closing said opening, a shaft upon which the damper swings mounted in said support, and rack and pinion connections between said shaft and said support and between said shaft and said damper, whereby rotation of said shaft adjusts it transversely to its axis and thereby varies its position with reference to the damper without disturbing the relation of the damper to said opening when the damper is in position to close the opening.

9. In combination, a support having an opening, a damper for closing said opening, a shaft upon which the damper swings mounted in said support, rack and pinion connections between said shaft and said support and between said shaft and said damper, whereby rotation of said shaft adjusts it transversely to its axis and thereby varies its position with reference to the damper without disturbing the relation of the damper to said opening when the damper is in position to close the opening, a motor mounted upon the support, and operating connections from the motor to the shaft for rotatably adjusting the latter.

10. A draft damper arranged to lie in a vertical plane when closed, a rack extending along the face of said damper, a shaft provided with a pinion having its axis extending horizontally and meshing with said rack and forming a support for said damper, whereby upon swinging motion of said damper about the shaft axis relative rolling motion is produced between the rack and pinion, a support, and means connecting said shaft and support to permit rolling motion of said shaft vertically along said support to vary the relation between said shaft and damper without affecting the relation between said damper and the opening which it closes when said opening is closed.

11. A device having an opening, a damper arranged to lie in a vertical plane when closing said opening, a rack extending along the face of said damper, a horizontally extending rotatable shaft forming a support for said damper and provided with a pinion meshing with said rack, said shaft being arranged to be vertically adjustable on rotation, and means for at all times maintaining meshing engagement between the rack and pinion teeth, said damper, rack and pinion being so constructed and arranged that the damper will freely swing about the pinion when the pinion is held against rotation.

MORRIS W. CREW.
JOHN W. MEYER.